A. ROSNER.
FUEL SYSTEM FOR INTERNAL COMBUSTION ENGINES.
APPLICATION FILED JULY 1, 1918.

1,372,194.

Patented Mar. 22, 1921.
3 SHEETS—SHEET 1.

Inventor:
Adolph Rosner,
by
Att'ys.

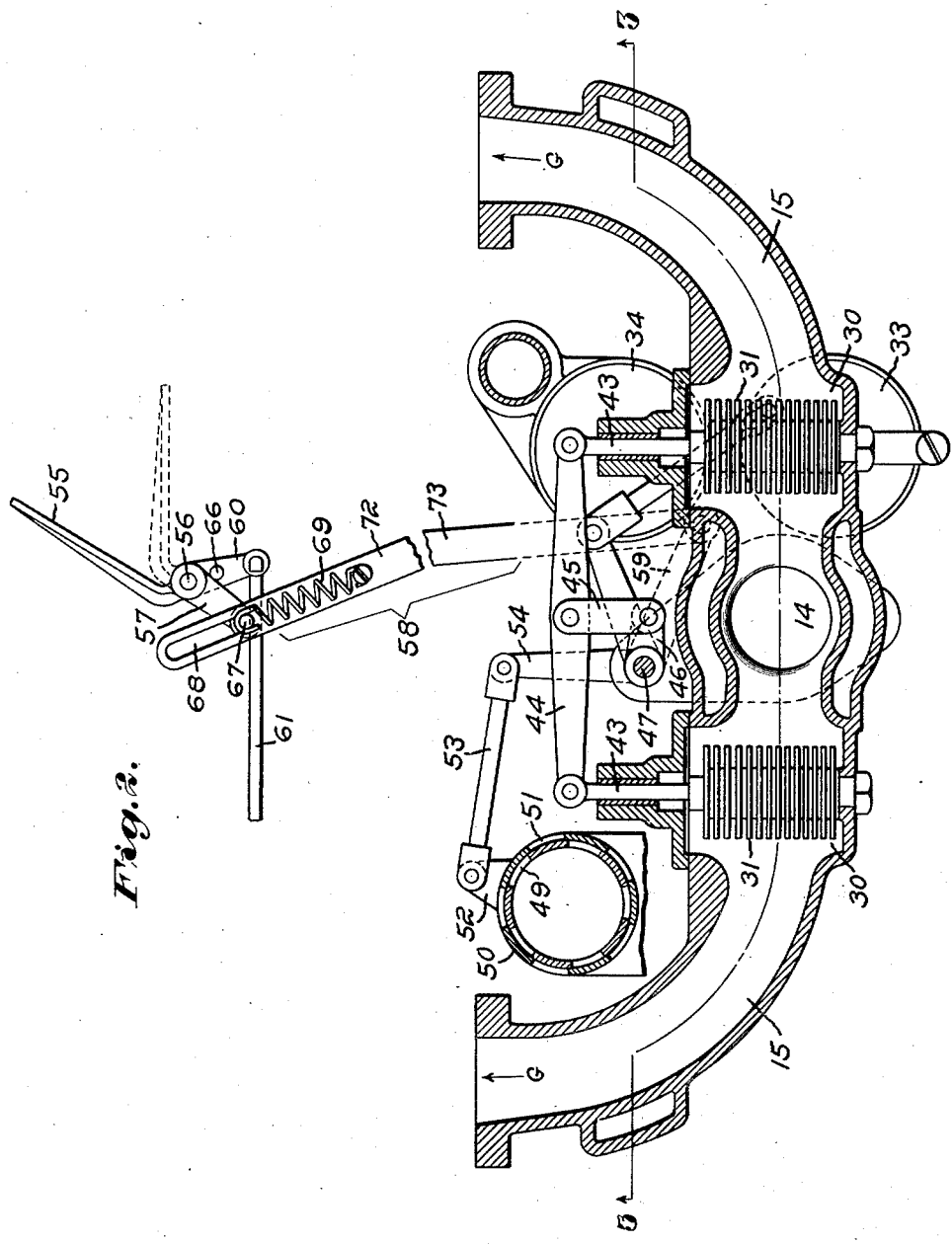

A. ROSNER.
FUEL SYSTEM FOR INTERNAL COMBUSTION ENGINES.
APPLICATION FILED JULY 1, 1918.
1,372,194.
Patented Mar. 22, 1921.
3 SHEETS—SHEET 3.
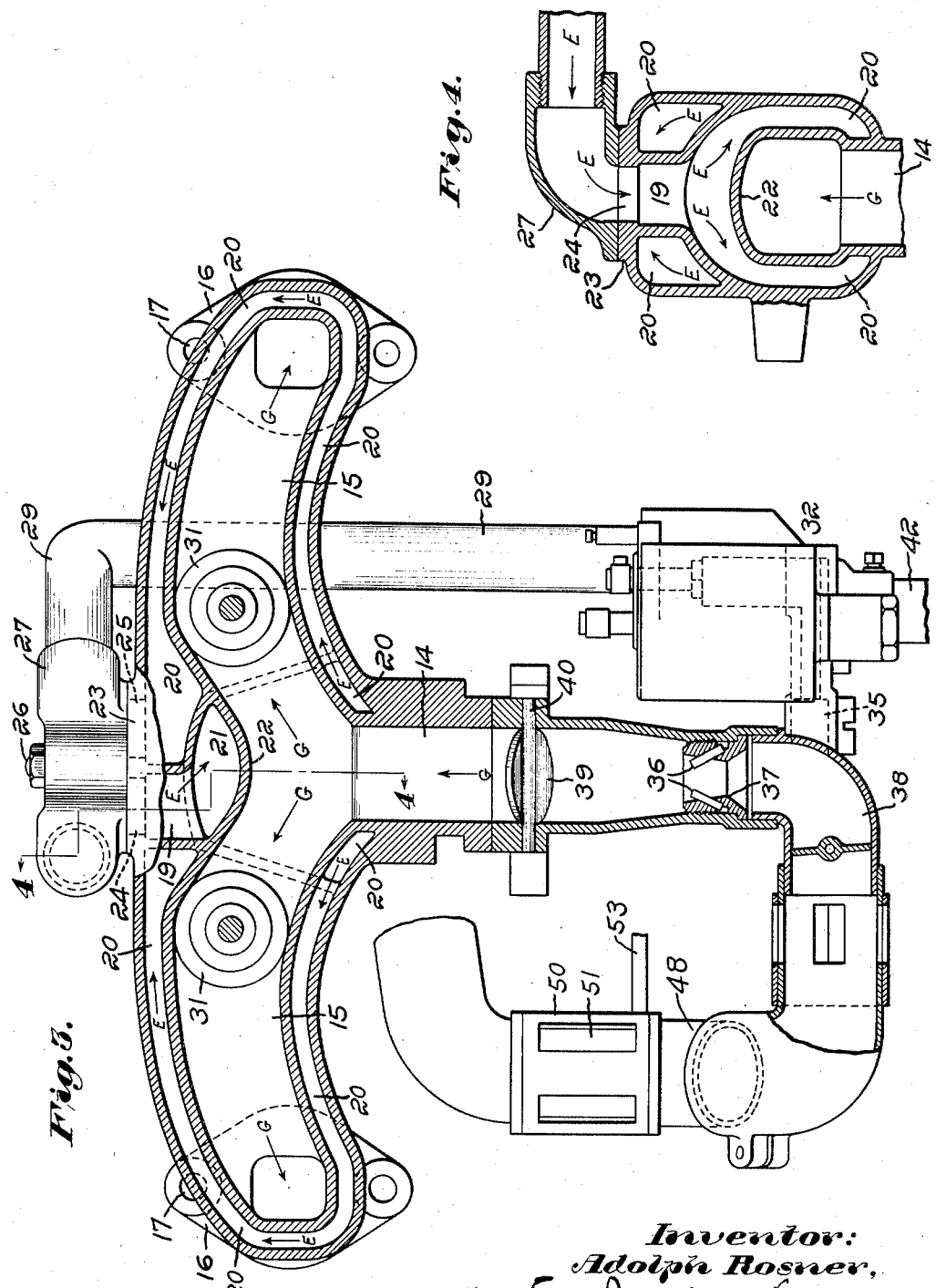
Inventor:
Adolph Rosner,
by [signature]
Attys.

UNITED STATES PATENT OFFICE.

ADOLPH ROSNER, OF BRIDGEPORT, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

FUEL SYSTEM FOR INTERNAL-COMBUSTION ENGINES.

1,372,194.    Specification of Letters Patent.    Patented Mar. 22, 1921.

Application filed July 1, 1918. Serial No. 242,976.

*To all whom it may concern:*

Be it known that I, ADOLPH ROSNER, a citizen of the United States, and a resident of Bridgeport, county of Fairfield, and State of Connecticut, have invented an Improvement in Fuel Systems for Internal-Combustion Engines, of which the following description, in connection with the accompanying drawings, is a specification, like characters on the drawings representing like parts.

This invention relates to fuel systems for internal combustion engines and is more particularly concerned with thermostatic means for controlling the temperature of the fuel and means for discontinuing the heating of the fuel at will.

My invention will be best understood by reference to the following description when taken in connection with the accompanying drawings of one illustrative embodiment thereof, while its scope will be more particularly pointed out in the appended claims.

In the drawings:—

Fig. 2 is a horizontal section on an enlarged scale showing the intake manifold, the thermostats and the mechanism actuated thereby for operating the exhaust-controlling valve;

Fig. 3 is a sectional view on the line 3—3 of Fig. 2; and

Fig. 4 is a detail sectional view on the line 4—4 of Fig. 3.

Figure 1:
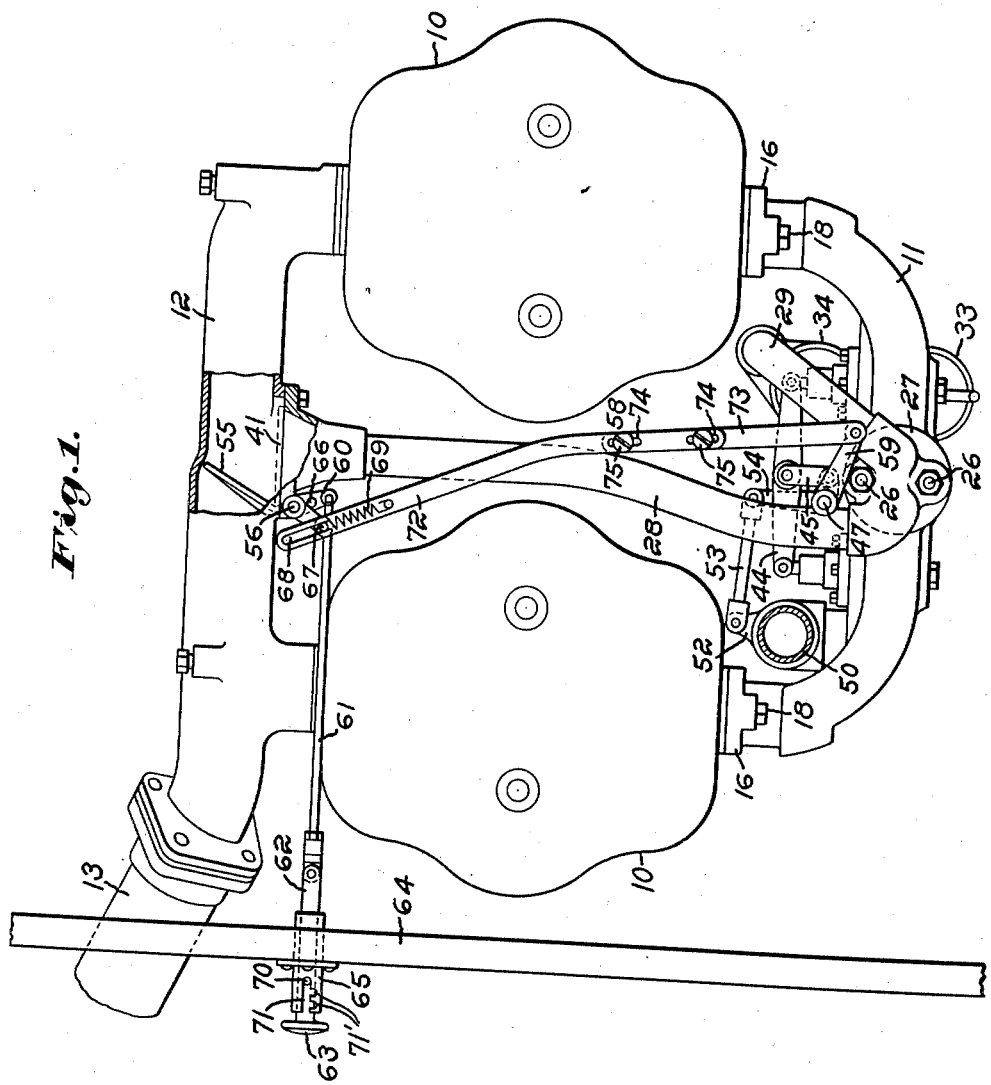
Figure 1 is a plan of an internal combustion engine equipped with a fuel system embodying my invention, a portion of the exhaust manifold being broken away and shown in section the better to illustrate the valve for controlling the application of heat to the fuel.

Referring to the drawings and to the embodiment of my invention which is illustrated therein, I have shown for purposes of exemplification an internal combustion engine of the four-cylinder type having its cylinders cast in pairs 10—10 which may receive their supply of combustible mixture through an intake manifold 11 which may be of any appropriate construction. The exhaust gases may be carried away by an exhaust manifold 12 leading to an exhaust pipe 13.

While the intake manifold may be of any usual or desired construction, I have herein shown a manifold which, *per se*, is not my invention, the same being provided with a fuel intake passage having an inlet trunk 14, and two branches 15 conduct the vaporized fuel to the engine cylinders 10 to which the manifold may be secured in any suitable manner, as by providing the same with flanges 16 having holes 17 to receive the usual studs 18. The mixture of air and fuel drawn from the carbureter hereinafter described, into the inlet trunk 14, flows through the branches 15 to the engine cylinders 10 in streams whose directions are indicated by the several arrows G in Figs. 2, 3 and 4.

The use of the grades of gasolene now being supplied, and more especially in cases where it is attempted to use kerosene or distillate as a fuel, much difficulty is experienced owing to the fact that the vaporized fuel has a strong tendency to condense. Some of the liquid fuel is deposited in the intake passages, and some is carried even into the cylinders. This is attended by several undesirable results, including the rapid formation of carbon deposits, to say nothing of the lack of economy and the difficulties had with the proper functioning of the engine. These troubles are too well-known to require further description.

In the intake manifold selected for illustration, there is provided a heating fluid passage adapted to receive some suitable hot fluid such, for example, as the exhaust from the engine. This stream of heating fluid is conducted in proximity to the fuel passages and in such a way as to secure the best possible results. In the present example I have shown a heating fluid passage having a trunk 19 and two branches 20 leading therefrom. Preferably the inlet trunk 19 for the heating fluid is adjacent the inlet trunk 14 for the combustible mixture, and preferably one trunk leads in the opposite direction with respect to the other. In the present example the arrangement is such that the heating fluid is brought into the manifold transversely of the branch passages 15 of the fuel conduit, and is then conducted to the incoming stream of gaseous fuel through use of a chamber 21 which, in turn, communicates with the branches 20.

Thus there is provided at this point where the fuel enters and is divided into two streams, what is known as a "hot spot" at which the heat is concentrated just as the mixture of vaporized fuel and air leaves the carbureter. It should here be noted that at the lower part of the chamber 21 where the inlet trunk 19 delivers the hot exhaust, said chamber is provided with a wall 22 extending in a general direction transversely of the entering stream of hot exhaust, as well as transversely of the stream of vaporized fuel and air which enters the fuel intake trunk 14. Thus it should be evident that both streams impinge in opposite directions on opposite surfaces of the wall 22, thus perfecting the vaporization of the hydrocarbon which is more or less in the condition of a fog mixture when it strikes the surface.

By reference to Fig. 3, it will be observed that the branches 20 lead from the chamber 21 in a downward direction about the sides of the fuel conduit to a point beneath the branches of the latter, and then longitudinally of and beneath said branches. By this means any liquid fuel gravitating to the bottom of the fuel passages is subjected to the heating effect of the stream of hot exhaust therebeneath and is revaporized. The branches 20 lead then in an upward direction transversely of the branches 15, as best shown at the extreme right and left-hand ends of Fig. 3, and then above and longitudinally of the branches 15 and in the opposite direction, as best shown in the upper portion of Fig. 3. Thus it is evident that the stream of heating fluid is conducted first transversely then lengthwise of and in the same direction as the stream of gaseous fuel, and then lengthwise of and in the opposite direction, passing first beneath the fuel passage and then above. By this means the best effect is secured, since the greatest heat of the exhaust gas is applied where it is most needed, and after it has become somewhat cooled, it is carried along the upper portion of the fuel conduit where less heat is needed. The direction of flow of the exhaust gas is indicated by the several arrows E in Figs. 3 and 4.

Any suitable provision may be made for connecting the heating fluid passages to suitable conduits to conduct the heating fluid to and from the manifold 11, but in the present example I have provided the latter with a boss 23, best shown in Figs. 3 and 4, having an opening 24 for the entrance and an opening 25 for the exit of said fluid. Herein this boss is threaded to receive studs 26 by means of which the manifold may be secured to a header 27 to which conduits 28 and 29 are connected. It should here be observed, by reference to Figs. 3 and 4, that the branches 20 come together at a point adjacent the outlet orifice 25 and that one branch is subdivided and surrounds the trunk 19, as will be readily understood from a comparison of Figs. 3 and 4. In Fig. 2 I have shown the branches 15 somewhat enlarged, as at 30 to form chambers for thermostats 31 which are preferably disposed in the path of the gaseous fuel on opposite sides of the inlet trunk 14 and in positions best calculated to provide for their use in controlling the temperature of the fuel as hereinafter described.

As a means for supplying a combustible mixture to the intake manifold, I may provide any usual or desired carbureter, such as the carbureter 32, which *per se* forms no part of my invention, and hence it is unnecessary here to show or describe it in detail, except that it may be noted that the carbureter selected for illustration is one of a type using two fuels, one a highly explosive hydrocarbon, such as gasolene, and the other a heavier and less explosive hydrocarbon, such as kerosene or distillate. To this end the carbureter selected for illustration is provided with two usual and well-known float chambers 33 and 34, either of which is adapted to deliver liquid fuel through a passage 35 leading to one or more nozzles 36 which deliver streams of atomized fuel into the throat of a Venturi tube 37, best shown in Fig. 3. It is unnecessary here to describe the remaining details of the carbureter, since they have nothing whatever to do with my present invention, it being understood that the engine operates in a usual and well-known manner to draw air through an intake passage 38 and through the Venturi tube 37 into the mixing chamber thereabove, whence it is delivered into the intake manifold 11 under the control of a suitable throttle valve 39, herein of the well-known butterfly type having a stem 40.

Referring again to the pipe 28 (see Fig. 1) hereinbefore described, which is used to conduct exhaust gas to the intake manifold 11 to heat the latter, said pipe may be connected to the exhaust manifold 12 in any appropriate manner, but I have herein provided the latter with an opening 41 which may be, and is, herein intermediate the cylinder units 10. By this means the hot exhaust gases taken from the manifold 12 through the opening 41 into the pipe 28 are conducted in proximity to the combustible mixture while the latter is on its way to the cylinders. After the exhaust gas has been utilized to heat the intake manifold, it is cooled to a considerable extent, and, if desired, it can then be led through the hereinbefore described pipe 29 to a point adjacent the kerosene float chamber 34 to raise the temperature of the latter to facilitate carburation, after which the gases are conducted by a pipe 42 to any suitable point The thermostats 31 may be of any appropriate type, but in the present example I have shown a common form of hollow, corrugated, accordion-like thermostat which expands axially when heated and contracts when cooled. I prefer to employ two thermostats 31 instead of one, in order to secure equal resistance in the two branches of the manifold. This arrangement is preferred to the placing of a single thermostat at the junction of the trunk and branches of the manifold, since at that point the gases are not at their full heat. As a means for coordinating the action of the thermostats and equalizing their effect, I have herein provided them with stems 43 connected to each other by a floating equalizing lever 44 best shown in Fig. 2. This lever is pivoted at its ends to said stems and at its central portion is connected by a link 45 to an arm 46, the latter in the present example being secured to a vertical shaft 47. This shaft may be utilized to operate one or more controlling devices in connection with the fuel system. As a means for automatically controlling the supply of cold air to the carbureter intake, I have herein shown an intake conduit 48 provided with a plurality of ports 49, best shown in Fig. 2, regulated by a sleeve valve 50 having similar ports 51 which may be caused to register therewith to a greater or less extent in accordance with the requirements of the engine. The valve may be, and is, herein thermostatically operated, and to that end is provided with an arm 52 connected by a link 53 to an arm 54, the latter being secured to the shaft 47 which, it will be remembered, is oscillated by the thermostats 31 and hence responds to variations in temperature of the mixture in the intake manifold. When the thermostats are contracted, the ports 51 are out of registration with the ports 49 and no cold air can enter. If the speed and load of the engine are increased, it is found that the temperature of the incoming mixture increases, thereby causing the thermostats to expand and in so doing to open the ports to a greater or less extent, depending on the temperature of the mixture.

As a means for varying the application of the heat of the exhaust gases to the fuel, I have herein provided at a suitable point in the exhaust system, an exhaust-controlling valve 55 (see Figs. 1 and 2) herein disclosed in the exhaust manifold 12 adjacent the lateral opening 41 intermediate the two cylinder units 10. When this valve is disposed in the position shown in full lines in Fig. 1, all of the exhaust gas of one cylinder unit is diverted and compelled to flow through the pipe 28 and header 27 into and through the passages 19 and 20 of the intake manifold, thence out again through the header 27, thence it passes through the pipe 29 to a point adjacent the float chamber 34, heating the latter and then on out through the pipe 42 to the atmosphere. Under these circumstances the full heating effect of the exhaust of one cylinder unit is utilized to heat the combustible mixture and the liquid fuel.

When, however, the exhaust-controlling valve 55 is moved from the position shown in full lines in Figs. 1 and 2 to the dotted position shown therein, it closes the opening 41, thus entirely cutting off the supply of exhaust gas from the pipe 28 and causing all of the exhaust to pass out through the exhaust manifold 12 and exhaust pipe 13. It is evident that in various intermediate positions of the valve different heating effects can be secured by diverting more or less of the hot exhaust gas, according to the position which the valve occupies.

As a means for utilizing the thermostats 31 to operate the exhaust-controlling valve 55, I have herein mounted the latter on a pivot 56 to which is also secured an arm 57 connected by a link 58 to an arm 59, the latter being secured to the upper end of the thermostatically operated rock-shaft 47 hereinbefore described. The arrangement is such that as the speed and load increase and the heat of the exhaust gases increases, the amount of exhaust gas diverted for the purpose of heating the mixture is diminished. This is due to the fact that the thermostats are responsive to changes in temperature of the mixture and any tendency of the latter to increase in temperature is offset or counteracted by the action of the thermostats in causing the valve 55 to approach the opening 41 through a greater or less extent depending upon the amount of movement imparted by the thermostats.

Under some circumstances, it may be desirable to reduce or discontinue the supply of heat altogether. Should it become necessary or desirable to run the engine on gasolene only, it might be desirable to close the exhaust-controlling valve 55 and to render the thermostats ineffective to control the heating of the fuel. Sometimes it might be desirable to limit the range of movement of the valve to less than the full throw indicated in Fig. 1. To these ends, in the present instance, I have shown manually operable means including an arm 60 connected by a link 61 to a plunger 62 having a handle 63 which may be located at some convenient point, as, for example, on a dash-board 64 to which is secured a guide 65 for said plunger. Suitable provision is made to cause the arm 60 to carry the arm 57 and to close the valve 55 when the plunger 62 is moved in a rearward direction (toward the left, Fig. 1). In the present example, this is accomplished by providing the arm 60 with a pin or other suitable projection 66 to engage and carry with it the arm 57, and by providing the latter with the pin 67 located in a slot 68 extending lengthwise of the link 58.

A suitable spring 69 is secured at one end to the link 58, and at its other end to the pin 67, the arrangement being such that the spring constantly tends to draw the pin 67 toward the inner end of the slot 68, and to carry the arm 57 up against the adjustable stop pin 66. Under conditions requiring the use of the maximum heat of the exhaust, the pin 67 may be positioned as shown in Figs. 1 and 2, and as the link 58 is moved to and fro lengthwise under the influence of the thermostats, the valve 55 will have a maximum range of movement. When, however, the operator wishes to shut off the heat altogether, he pulls the knob or handle 63 toward him, thus causing the pin 66 to carry the arm 57 until the pin 67 brings up in the other end of the slot 68, in which position the valve 55 will be closed, as shown in dotted lines in Figs. 1 and 2. The valve may be locked in this position in any appropriate manner, as by providing the plunger 62 with a pin 70 normally located in the inner end of a slot 71 in the plunger guide 65, the knob or handle 63 being suitably swiveled to turn in said guide, so that when the pin 70 is withdrawn from the slot 71, the pin may be turned to a position out of registration with the slot 71, thereby preventing forward movement of the plunger 62. When this occurs, the spring 69 is rendered ineffective to cause the valve 55 to follow the movements of the link 58, and hence the action of the thermostats continues without affecting the exhaust-controlling valve. To compensate for seasonal changes and variations in the temperature of the atmosphere from time to time, the range of movement of the valve 55 may be varied from zero to maximum. To this end, I may provide any suitable number of lateral slots or notches 71' to receive the pin 70, thereby to position the stop pin 66 according to the needs of the situation. If desired, the link 58 may be made adjustable in length, as by constructing the same in two parts 72 and 73, one provided with slots 74 to receive clamping screws 75 threaded into the other. This arrangement facilitates the initial assembling and subsequent adjusting of the parts.

It should now be understood that, in addition to providing means for automatically varying the amount of exhaust gases diverted for heating the combustible mixture in response to and in accordance with changes of temperature of the mixture, I have provided means at will to discontinue the heating effect altogether. Moreover, I have provided means for coördinating the action of the cold air controlling valve and the exhaust-controlling valve, so that when the engine is operating at slow speeds or in a low temperature of the surrounding atmosphere, the introduction of cold air into the mixture will be reduced or cut off altogether, while at the same time, the heating effect of the exhaust gases on the fuel is increased, and vice versa.

While I have herein shown and described one specific embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form of embodiment of the invention may be made without departing from the principles thereof.

Having thus described one embodiment of my invention, what I claim and desire by Letters Patent to secure is:

1. In a fuel system for internal combustion engines, the combination of fuel-heating means, thermostatic heat-controlling means, and means at will to vary the effect of said heat-controlling means.

2. In a fuel system for internal combustion engines, the combination of fuel-heating means, thermostatic heat-controlling means, and heat control adjusting means.

3. In a fuel system for internal combustion engines, the combination of fuel-heating means, thermostatic heat-controlling means, and adjustable limiting means for said heat-controlling means.

4. In a fuel system for internal combustion engines, the combination of fuel-heating means, thermostatic heat-controlling means, and means at will to increase or diminish the range of said heat-controlling means.

5. In a fuel system for internal combustion engines, the combination of fuel-heating means, thermostatic heat-controlling means, and means at will to vary or nullify the effect of said heat-controlling means.

6. In a fuel system for internal combustion engines, the combination of fuel-heating means, a heat-controlling element, a temperature-responsive element actuating said heat-controlling element, and means variably to limit the action of said heat-controlling element under the influence of said temperature-responsive element.

7. In a fuel system for internal combustion engines, the combination of fuel-heating means, a heat-controlling element, a temperature-responsive element actuating said heat-controlling element, and means to prevent movement of said heat-controlling element under the influence of said temperature-responsive element.

8. In a fuel system for internal combustion engines, the combination of a valve for controlling the application of heat to the fuel, temperature-responsive means to actuate said valve, and means manually operable to actuate said valve.

9. In a fuel system for internal combustion engines, the combination of a valve for controlling the application of heat to the fuel, temperature-responsive means to actuate said valve, and an adjustable valve stop.

10. In a fuel system for internal combustion engines, the combination of a valve for controlling the application of heat to the fuel, temperature-responsive means to actuate said valve, and means to vary the range of movement of said valve.

11. In a fuel system for internal combustion engines, the combination of a valve for controlling the application of heat to the fuel, temperature-responsive means to actuate said valve, a yielding connection between said valve and said temperature-responsive means, and an adjustable stop for limiting the movement of said valve under the influence of said temperature-responsive means.

12. In a fuel system for internal combustion engines, the combination of a valve for controlling the application of heat to the fuel, temperature-responsive means to actuate said valve, a spring to cause said valve to follow the operation of said thermostat, and means to limit the extent to which said valve can follow the operation of said thermostat.

13. In a fuel system for internal combustion engines, the combination of fuel-heating means, thermostatic heat-controlling means, and means to render said heat-controlling means ineffective to control the heating of the fuel.

14. In a fuel system for internal combustion engines, the combination of means to utilize the heat of the engine's exhaust to heat the fuel, thermostatic means to control the application of the heat to the fuel, and means to render said heat-controlling means ineffective to control the heating of the fuel.

15. In a fuel system for internal combustion engines, the combination of fuel-heating means, a fuel-heated thermostat, regulating means controlled by said thermostat to regulate the amount of heat supplied to the fuel, and means at will to render said thermostat ineffective to control said regulating means.

16. In a fuel system for internal combustion engines, the combination of fuel-heating means, a fuel-heated thermostat, regulating means controlled by said thermostat to regulate the amount of heat supplied to the fuel, and means at will to stop the supply of heat to the fuel.

17. In a fuel system for internal combustion engines, the combination of fuel-heating means, a thermostat responsive to changes of temperature of the fuel, a valve controlled by said thermostat to regulate the amount of heat supplied to the fuel, and manually operable means to close said valve.

18. In a fuel system for internal combustion engines, the combination of fuel-heating means, a thermostat responsive to changes of temperature of the fuel, a valve controlled by said thermostat to regulate the amount of heat supplied to the fuel, and means to prevent the operation of said valve by said thermostat.

19. In a fuel system for internal combustion engines, the combination of fuel-heating means, a thermostat responsive to changes of temperature of the fuel, a valve controlled by said thermostat to regulate the amount of heat supplied to the fuel, a spring normally causing said valve to follow the operation of said thermostat, and means to render said spring ineffective to cause the action of said valve in response to said thermostat.

20. In a fuel system for internal combustion engines, the combination of fuel-heating means, a thermostat responsive to changes of temperature of the fuel, a valve controlled by said thermostat to regulate the amount of heat supplied to the fuel, a spring normally causing said valve to follow the operation of said thermostat, and means to close said valve and hold the same in its closed position in opposition to the action of said spring.

21. In a fuel system for internal combustion engines, the combination of means including a valve for controlling the admission of cold air to the combustible mixture, means including a valve for controlling the application of heat to the combustible mixture, and means to coördinate the action of said valves.

22. In a fuel system for internal combustion engines, the combination of means including a valve for controlling the admission of cold air to the combustible mixture, means including a valve for controlling the application of heat to the combustible mixture, and means to cause a diminution of the amount of cold air supplied to the mixture to be accompanied by an increase of the amount of heat applied to the mixture.

23. In a fuel system for internal combustion engines, the combination of means including a valve for controlling the admission of cold air to the combustible mixture, means including a valve for controlling the application of heat to the combustible mixture, and temperature-responsive means to cause a diminished supply of cold air to be accompanied by an increased supply of heat to the mixture.

24. In a fuel system for internal combustion engines, the combination of a heat-controlling valve 55, a thermostat 31 controlling said valve, and operative connections therebetween including arms 57 and 60, one of which carries said valve, a stop 66, limiting relative movement of said arms in one direction, and a spring 69 urging one arm toward said stop.

25. In a fuel system for internal combustion engines, the combination of a heat-controlling valve, a temperature-responsive element controlling said valve, yielding operative connections therebetween including a spring 69 tending to move said valve in one direction, and a variably positioned stop 66 limiting such movement of said valve.

26. In a fuel system for internal combustion engines, the combination of means for utilizing engine heat to heat the fuel, means responsive to changes of temperature of a part of the engine to control the application of heat to the fuel, and means at will to vary the effect of said responsive means.

27. In a fuel system for internal combustion engines, the combination of fuel-heating means utilizing heat derived from the combustion of the fuel, temperature-responsive, heat-controlling means, and heat control adjusting means.

28. In a fuel system for internal combustion engines, the combination of fuel-heating means, thermostatic heat-controlling means, and means at will to vary the effect of said heat-controlling means while the engine is in operation.

In testimony whereof, I have signed my name to this specification.

ADOLPH ROSNER.